United States Patent
Ghannam et al.

(10) Patent No.: US 12,371,107 B2
(45) Date of Patent: Jul. 29, 2025

(54) METHOD FOR TRUCK BACKUP WITH DYNAMIC LENGTH

(71) Applicant: Ford Global Technologies, LLC, Dearborn, MI (US)

(72) Inventors: Mahmoud Yousef Ghannam, Canton, MI (US); Bradford Scott Bondy, St. Clair Shores, MI (US); Muhannad Anwar Hamdan, Canton, MI (US); Christian Wegner, Grosse Ile, MI (US)

( * ) Notice: Subject to any disclaimer, the term of this patent is extended or adjusted under 35 U.S.C. 154(b) by 461 days.

(21) Appl. No.: 17/938,463

(22) Filed: Oct. 6, 2022

(65) Prior Publication Data

US 2024/0116578 A1   Apr. 11, 2024

(51) Int. Cl.
*B62D 33/027* (2006.01)
*B62D 33/03* (2006.01)
*E05F 15/43* (2015.01)

(52) U.S. Cl.
CPC ......... *B62D 33/0273* (2013.01); *B62D 33/03* (2013.01); *E05F 15/43* (2015.01);
(Continued)

(58) Field of Classification Search
CPC .......................... B62D 33/0273; B62D 33/037; B62D 33/027; B62D 33/023; B62D 33/03;
(Continued)

(56) References Cited

U.S. PATENT DOCUMENTS 6,779,825 B1 *  8/2004  Greenert ................... B60P 1/26
                                                    296/57.1

8,330,814 B2    12/2012  Matsuda et al.
(Continued)

FOREIGN PATENT DOCUMENTS

CN    113404399 A  *  9/2021
CN    113914736 A  *  1/2022
(Continued)

OTHER PUBLICATIONS

MikesCarInfo, New RAM Truck Tailgate Aug. 8, 2019, Youtube.com (Year: 2019).*
(Continued)

*Primary Examiner* — Erin M Piateski
*Assistant Examiner* — Ashley Tiffany Schoech
(74) *Attorney, Agent, or Firm* — Frank Lollo; Eversheds Sutherland (US) LLP (57) ABSTRACT

A vehicle having a tailgate configured to move between retracted and extended positions is disclosed. The vehicle includes a first detection unit, a second detection unit, a third detection unit and a control unit. The control unit obtains a first input from the first detection unit and determines whether the tailgate is in extended position. The control unit further obtains a second input and a third input from the second and third detection units respectively, when the tailgate is in the extended position. Responsive to obtaining the second and third inputs, the control unit identifies a tailgate extended orientation. In addition, the control unit detects an obstacle presence in a vehicle rear side proximity and calculates a calibrated distance between the obstacle and a tailgate top side, based on the tailgate extended orientation. The control unit notifies a vehicle user when the calibrated distance is less than a threshold.

20 Claims, 9 Drawing Sheets

(52) U.S. Cl.
CPC ... *E05F 2015/433* (2015.01); *E05Y 2900/516* (2013.01); *E05Y 2900/546* (2013.01)

(58) Field of Classification Search
CPC .... B62D 33/0276; E05F 15/43; E05F 15/432; E05F 15/33; E05Y 2900/516; E05Y 2900/518; E05Y 2900/53; E05Y 2900/50; E05Y 2900/544; E05Y 2900/546; B60W 50/14; B60W 50/143; B60W 2420/54; B60W 2420/403
See application file for complete search history.

(56) References Cited

U.S. PATENT DOCUMENTS

| | | | | |
|---|---|---|---|---|
| 8,830,317 | B2* | 9/2014 | Meier | B60Q 1/00 348/148 |
| 9,199,576 | B2 | 12/2015 | Van Wiemeersch | |
| 10,086,870 | B2 | 10/2018 | Gieseke et al. | |
| 10,607,092 | B2 | 3/2020 | Murad et al. | |
| 2002/0084675 | A1* | 7/2002 | Buchanan, Jr. | B60J 5/101 296/146.8 |
| 2005/0269833 | A1* | 12/2005 | Park | E05F 1/1091 296/146.8 |
| 2009/0248257 | A1* | 10/2009 | Hoshino | B60N 2/1625 701/49 |
| 2013/0055639 | A1* | 3/2013 | Brosseit | E05F 15/43 49/31 |
| 2019/0152387 | A1* | 5/2019 | Naserian | B60Q 9/00 |
| 2022/0063736 | A1* | 3/2022 | Williams | B62D 33/0273 |
| 2022/0227296 | A1* | 7/2022 | Sperrle | G06T 3/4038 |
| 2023/0017327 | A1* | 1/2023 | Weston | B60W 40/12 |
| 2023/0311772 | A1* | 10/2023 | DeSimone | B60R 1/26 348/148 |

FOREIGN PATENT DOCUMENTS

| | | | |
|---|---|---|---|
| JP | H0849958 A | * | 2/1996 |
| JP | 2009299387 A | * | 12/2009 |

OTHER PUBLICATIONS

Robert Miller, We Get Some Time With The New Ram Multifunction Tailgate Aug. 24, 2019, 5thgenrams.com (Year: 2019).*
"Trigonometric functions", Aug. 7, 2020, Wikipedia (Year: 2020).*
GMC Life, Go With Confidence: The Safety and Driver Assistance Technology Offered on GMC Trucks and SUVs, GMC Safety Driver Assistance Technology, 2018, 1-11.

* cited by examiner

METHOD FOR TRUCK BACKUP WITH DYNAMIC LENGTH

BACKGROUND

Industries such as e-commerce, transportation, manufacturing, etc., rely heavily on pickup trucks. Pickup trucks have larger cargo handling capacity as compared to small passenger vehicles and typically provide greater utility for transportation of goods. Further, some pickup trucks include tailgates or extendable beds that enable truck users to further increase a trucks' cargo handling capacity.

While extending the tailgate may increase trucks' cargo handling capacity, the truck user may need external support or guidance when the truck user backs up the truck with the extended tailgate.

Many trucks include ultrasonic sensors installed at the truck's rear that may assist the truck user during truck backup. For example, the ultrasonic sensors may notify the truck user when the truck user reverses the truck and an obstacle is in a truck's rear end proximity. However, the truck's ultrasonic sensors may not notify the truck user when the obstacle is in the tailgate's extended edge proximity.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed towards a vehicle having a tailgate that may move between a retracted position and an extended position. For example, the present disclosure relates to truck backup systems and methods to assist a truck user during truck backup when the tailgate is in an extended position.

In certain embodiments, the vehicle may be, for example, a pickup truck having a cargo bed. A vehicle user may increase vehicle's cargo handling capacity by moving the tailgate from the retracted position to a fully extended or an intermediate extended position. The vehicle may include a processor that may assist the user when the user reverses the vehicle with the tailgate in the fully extended or an intermediate extended position. Specifically, the processor may use vehicle ultrasonic sensors to detect an obstacle in a vehicle rear side proximity when the user reverses the vehicle, and notify the user when a distance between the obstacle and the tailgate (or the vehicle rear side) is less than a threshold. In some aspects, the processor may be configured to calculate a distance between a tailgate top side and the obstacle based on the tailgate position (e.g., retracted, fully extended or intermediate positions) and ultrasonic sensor inputs, and transmit an audio or visual notification for the user when the distance between the obstacle and the tailgate top side is less than the threshold.

Specifically, the processor may determine whether the tailgate is in the retracted position or the extended position by using a detection unit when the user reverses the vehicle. The detection unit may be, for example, a tailgate ajar switch. Responsive to determining that the tailgate is in the extended position, the processor may determine a tailgate extended orientation. The tailgate extended orientation may indicate an angle at which the tailgate may be titled with respect to a cargo bed plane or vehicle side edges. In some aspects, the processor may determine the tailgate extended orientation by using a vehicle Center High Mounted Stop Lamp (CHMSL) camera and/or a dual backup camera that may be mounted on the tailgate. The processor may further calculate an extended tailgate portion length based on the tailgate extended orientation.

Furthermore, the processor may determine whether a height of the obstacle in the vehicle rear side proximity is higher than a tailgate level. The processor may determine an obstacle height by using inputs received from the vehicle CHMSL camera and the dual backup camera. The processor may further calculate the distance between the tailgate top side and the obstacle based on the extended tailgate portion length, when the obstacle height is higher than the tailgate level. The processor may send the audio or visual notification to the user when the distance reduces below the threshold, as the user reverses the vehicle.

The present disclosure discloses a system to assist the user to reverse the vehicle with the extended tailgate. The system uses existing vehicle components and sensors to determine the tailgate orientation and assist the user during vehicle backup operation. Therefore, the system does not require additional resources and does not increase vehicle weight and complexity. Further, the system may work with different types of tailgates, e.g., a solid single tailgate, a split gate tailgate having steps and the like.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
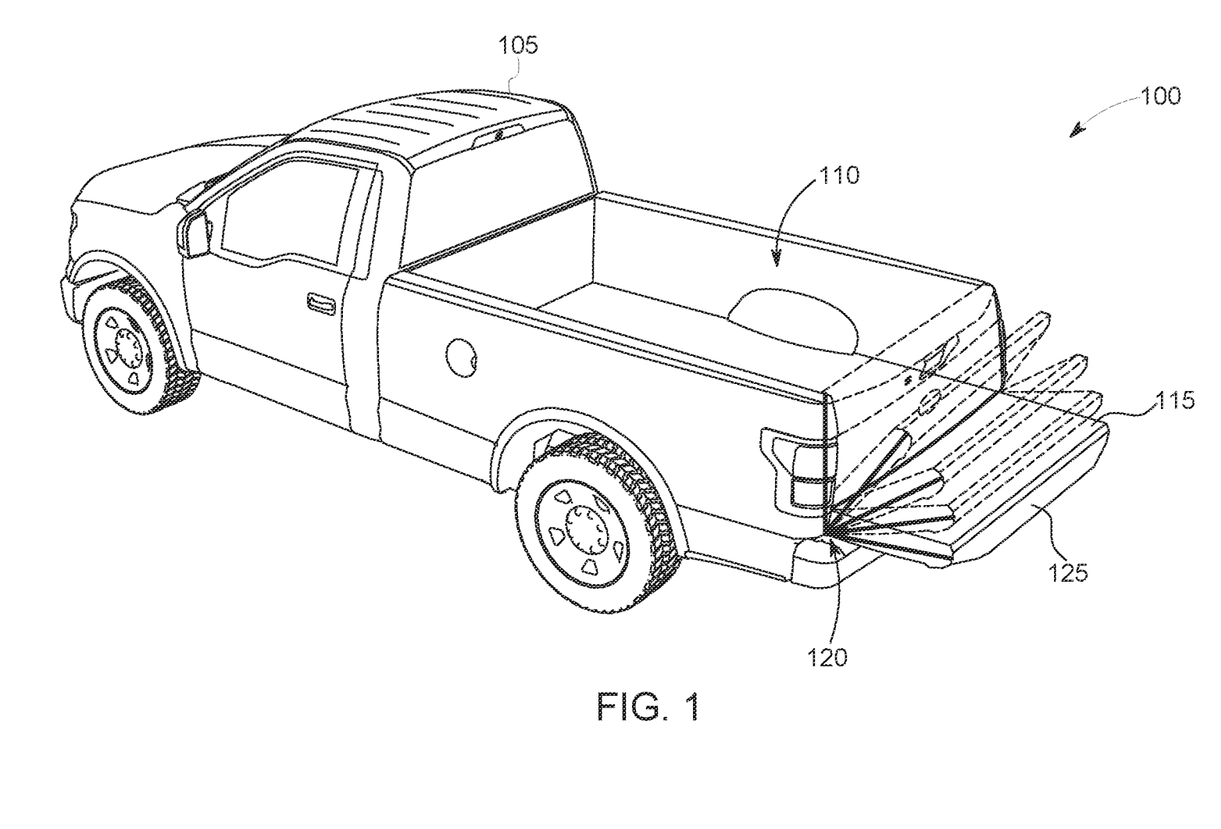
FIG. 1 depicts an example vehicle in which techniques and structures for providing the systems and methods disclosed herein may be implemented.

FIG. 1 depicts an example vehicle 100 in which techniques and structures for providing the systems and methods disclosed herein may be implemented. The vehicle 100 may be, for example, a pickup truck, a sports utility vehicle (SUV), a van, a truck trailer, an off-road vehicle and/or the like. In some aspects, the vehicle 100 may be an autonomous vehicle. In other aspects, a driver/operator (not shown) may operate the vehicle 100.

The vehicle 100 may include a passenger cabin 105 (or a vehicle cab) and a cargo box 110. The vehicle 100 may further include a tailgate 115 that may be hinged at a tailgate bottom side 120. The tailgate 115 may be of different types, for example, a solid single tailgate (as shown in FIG. 1), a split gate tailgate having steps and the like.

In some aspects, the tailgate 115 may be pivotably connected to the vehicle 100 via the tailgate bottom side 120 and configured to move between a retracted tailgate position and an extended tailgate position. Further, the tailgate 115 may include a latch mechanism (not shown) disposed on tailgate side edges near a tailgate top side 125, which may engage the tailgate 115 with the vehicle 100. In one or more aspects, the latch mechanism may include a first latch disposed on a right tailgate side edge and a second latch disposed on a left tailgate side edge. The tailgate 115 may be in the retracted (or closed) position when the latch mechanism is in a closed state and the tailgate 115 may be in the extended position (e.g., a fully open position) when the latch mechanism is in an open state.

The tailgate 115 may be configured to move between the retracted position and the extended position by locking or unlocking the latch mechanism. The retracted position may be a fully closed tailgate position and the extended position may be a fully opened tailgate position. In some aspects, the tailgate 115 may be perpendicular to a plane of ground when the tailgate 115 is in the fully closed tailgate position. Further, the tailgate 115 may be parallel to the plane of ground when the tailgate 115 is in the fully opened tailgate position.

The tailgate 115 may be further configured to move and be fixed to a plurality of intermediate positions between the retracted position and the extended position. In other words, the tailgate 115 may be stationed in any position between the fully closed tailgate position and the fully opened tailgate position. In some aspects, a vehicle operator (not shown) may move the tailgate 115 from the retracted position to any extended position (e.g., the fully opened tailgate position or any intermediate position) when the vehicle operator requires extra cargo space in addition to the cargo box 110. In some aspects, the vehicle operator may move the tailgate 115 by using a tailgate handle (not shown) or remotely (e.g., through a vehicle key fob).

The vehicle 100 may further include a tailgate ajar switch (not shown) that may be configured to provide an indication of a latch mechanism open or closed state. Specifically, the tailgate ajar switch may be a mechanical system that may be coupled to the latch mechanism and configured to detect whether the latch mechanism (e.g., the first latch and the second latch) is in the open state or the closed state. The tailgate ajar switch may be further configured to provide signals indicative of the tailgate position to a vehicle controller (not shown in FIG. 1), based on the detected latch mechanism state. For example, the tailgate ajar switch may send a signal to the vehicle controller indicating that the tailgate 115 may be in the retracted position, when the tailgate ajar switch detects that the latch mechanism is in the closed state. Similarly, the tailgate ajar switch may send a signal to the vehicle controller indicating that the tailgate 115 may be in the extended position (e.g., fully opened tailgate position or in any intermediate position), when the tailgate ajar switch detects that the latch mechanism is in the open state.

In some aspects, the vehicle controller may determine the tailgate position by using the signal received from the tailgate ajar switch and may assist the vehicle operator during a vehicle backup operation, when the vehicle operator reverses the vehicle 100. For example, the vehicle controller may alert the vehicle operator (e.g., by using a visual or an audio notification) if an obstacle is in a tailgate edge proximity, when the tailgate is in the extended position. The details of the process for assisting the vehicle operator during the vehicle backup operation may be understood in conjunction with FIG. 2.

Figure 2:
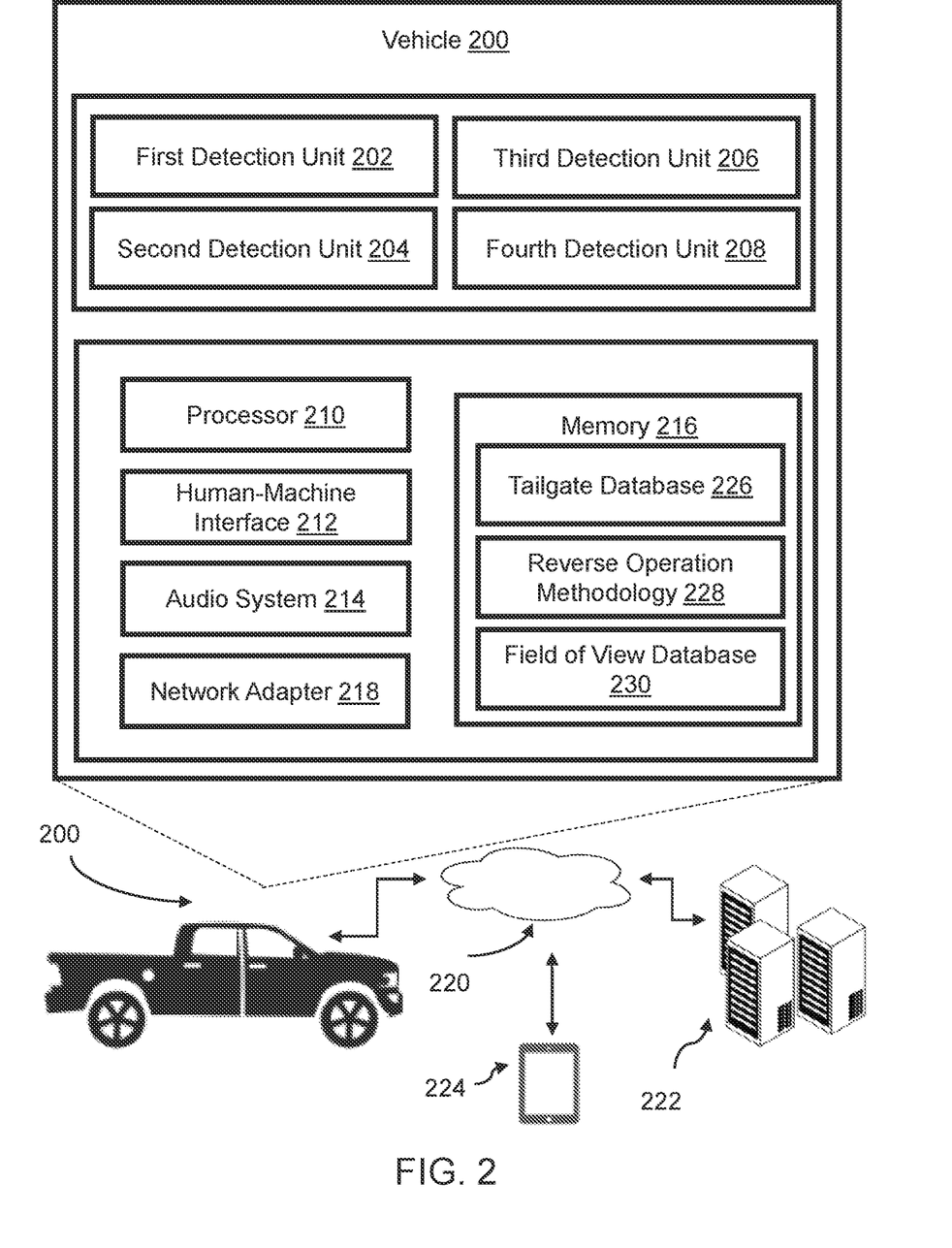
FIG. 2 illustrates a block diagram of an example vehicle for assisting a vehicle user during a vehicle reverse operation in accordance with the present disclosure.

FIG. 2 illustrates a block diagram of an example vehicle 200 (same as the vehicle 100) for assisting a vehicle user during a vehicle reverse operation in accordance with the present disclosure. While explaining FIG. 2 references will be made to FIGS. 3-7.

The vehicle 200 may include a first detection unit 202, a second detection unit 204, a third detection unit 206, a fourth detection unit 208, one or more processor(s) 210 (or a processor 210, or a control unit/controller), a human-machine interface 212, an audio system 214 and a memory 216, which may communicatively couple with each other.

The vehicle 200 may further include one or more network communication adapter(s) 218 (or a network adaptor 218) that may be enabled to communicatively connect the vehicle 200 with one or more networks 220. In some aspects, the network(s) 220 can be and/or include Internet protocol (IP)-based network(s) for communication between the vehicle 200 and one or more server(s) 222 and/or a user device 224 (or any other external device). The user device 224 may be, for example, a user device associated with the vehicle user (not shown). Further, the one or more server(s) 222 may be part of a cloud-based computing infrastructure and may be associated with and/or include a Telematics Service Delivery Network (SDN) that provides digital data services to the vehicle 200.

The network(s) 220 may transmit and receive data between the vehicle 200, the server(s) 222 and the user device 224. In one or more aspects, the network(s) 220 can be a managed IP network administered by a service provider. The network(s) 220 can be implemented in a wireless fashion, e.g., using wireless protocols and technologies, such as Wi-Fi, WiMAX, etc. The network(s) 220 can also connect with and/or include a wired network, e.g., an Ethernet network, a controller area network (CAN), etc., having any wired connectivity including, e.g., an RS232 connection, etc. The network(s) 220 can also be and/or include a packet-switched network such as a local area network, wide area network, metropolitan area network, the Internet, or other similar type of network environment. The network(s) 220 can be a fixed wireless network, a wireless local area network (LAN), a wireless wide area network (WAN), a personal area network (PAN), a virtual private network (VPN), intranet, or another suitable network system.

In some aspects, the processor 210 may be a hardware device for executing program instructions (aka software), stored in a computer-readable memory (e.g., the memory 216). The processor 210 may be disposed in communication with one or more memory devices (e.g., the memory 216 and/or one or more external database(s)).

The memory 216 can include any one or a combination of volatile memory elements (e.g., dynamic random-access memory (DRAM), synchronous dynamic random access memory (SDRAM), etc.) and can include any one or more nonvolatile memory elements (e.g., erasable programmable read only memory (EPROM), flash memory, electronically erasable programmable read only memory (EEPROM), programmable read only memory (PROM), etc.

In some aspects, the memory 216 may include one or more databases or modules, such as a tailgate database 226, a vehicle reverse operation module 228 and a field of view (FoV) database 230. The tailgate database 226 may be configured to store vehicle tailgate attributes such as tailgate dimensions (tailgate length, width, etc.). In some aspects, the tailgate attributes may be pre-stored in the tailgate database 226. In other aspects, the server 222 may send the tailgate attributes to the tailgate database 226 for storage purpose.

The vehicle reverse operation module 228 may store instructions or logical steps that may enable the processor 210 to perform a plurality of vehicle backup assist operations. The vehicle backup assist operations may include, for example, identifying the vehicle tailgate position, evaluating an obstacle in proximity to a vehicle rear side, calculating a distance between the vehicle rear side and the obstacle during the vehicle backup/reverse operation and/or the like. In some aspects, the instructions or the logical steps may be pre-stored in the vehicle reverse operation module 228. In other aspects, the server 222 may send the instructions or the logical steps to the vehicle reverse operation module 228 for storage purpose.

The FoV database 230 may be configured to store a mapping of standard FoVs captured by the second detection unit 204 and the third detection unit 206 for different tailgate positions. Specifically, the FoV database 230 may pre-store different second and third detection units' FoVs with respect to different tailgate positions (e.g., fully open tailgate position and intermediate tailgate positions). The details of the second detection unit 204 and the third detection unit 206 are described below.

In accordance with some aspects, the first detection unit 202 may be configured to detect the latch mechanism open or closed state. In particular, the first detection unit 202 may be mounted on the tailgate 115 (or on vehicle side edges). As discussed in conjunction with FIG. 1, in some aspects, the latch mechanism may be disposed on the tailgate side edges near the tailgate top side 125 to engage the tailgate 115 with the vehicle 200. In one or more aspects, the first detection unit 202 may be the tailgate ajar switch (as described in FIG. 1) that may be coupled to the latch mechanism and configured to detect whether the latch mechanism is in the open state or the closed state.

Figure 3:
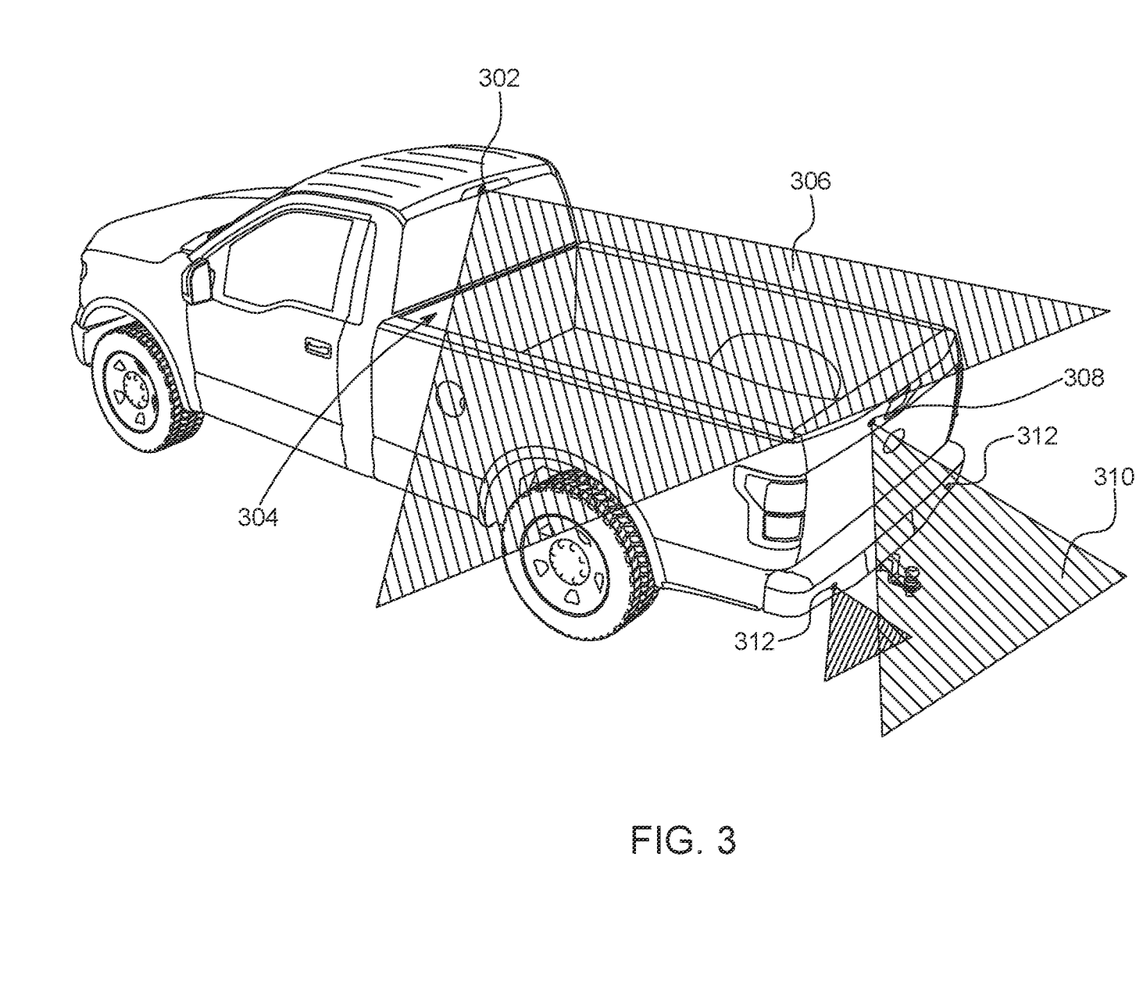
FIG. 3 depicts an example vehicle having a plurality of detection units in accordance with the present disclosure.

The second detection unit 204 may be a Center High Mounted Stop Lamp (CHMSL) camera that may be mounted at a vehicle cab rear top. An example of the vehicle cab rear top including the CHMSL camera is shown in FIG. 3. Specifically, FIG. 3 depicts the vehicle 200 having a plurality of detection units (including a CHMSL camera 302 mounted at the vehicle cab rear top), in accordance with the present disclosure.

As shown in FIG. 3, the second detection unit 204 (e.g., the CHMSL camera 302) may be mounted at top-front of a cargo box 304. The CHMSL camera 302 may be configured to capture a cargo box view 306, for example, a top front view of the cargo box 304. In some aspects, the processor 210 may use the cargo box view 306 to detect whether the tailgate 115 is in the retracted position or the extended position. The details of tailgate position detection by using the cargo box view 306 (or the CHMSL camera 302) may be understood in conjunction with FIG. 4.

The third detection unit 206 may be a rear or a backup camera 308 that may be mounted in proximity to the tailgate top side 125 (e.g., at a tailgate top center position). The third detection unit 206 may be mounted at a tailgate exterior surface, as shown in FIG. 3. Further, the third detection unit 206 may be configured to capture a vehicle rear view(s) 310. In some aspects, the third detection unit 206 may be a dual camera having two field of views (FoVs). In other words, the third detection unit 206 may include two cameras disposed in two different orientations to capture different vehicle rear views. In further aspects, the processor 210 may evaluate the FoVs captured by the third detection unit 206 to detect whether the tailgate 115 is in the retracted position or the extended position. In one or more aspects, the processor 210 may evaluate the FoVs captured by the third detection unit 206 for tailgate position detection when an FoV captured by the CHMSL camera 302 is obstructed. The details of tailgate position detection by evaluation of FoVs captured by the third detection unit 206 may be understood in conjunction with FIG. 5.

The fourth detection unit 208 may be ultrasonic sensors 312 that may be mounted on a vehicle rear side/fascia, for example, on a rear vehicle bumper. The fourth detection unit 208 may be configured to detect obstacles (objects) in a rear vehicle bumper proximity, especially when the vehicle user reverses the vehicle 200. In some aspects, the fourth detection unit 208 may be configured to send short ultrasonic signals, which may reflect from the obstacles that may be present in the rear vehicle bumper proximity. The fourth detection unit 208 may perform time of flight (TOF) analysis and calculate a distance between the rear vehicle bumper and the obstacle. In some aspects, the fourth detection unit 208 may notify the vehicle user when the calculated distance is less than a predefined threshold.

In some aspects, the vehicle 200 may activate the fourth detection unit 208 when the vehicle 200 is in a reverse mode. In further aspects, the vehicle 200 may include two ultrasonic sensors located at opposite side edges of the rear vehicle bumper, as shown in FIG. 3. In one or more aspects, there may be four ultrasonic sensors (not shown) located on the rear vehicle bumper. The ultrasonic sensors may be located at an equal distance from adjacent sensors.

The processor 210 may communicatively couple with the first detection unit 202, the second detection unit 204, the third detection unit 206 and the fourth detection unit 208. In particular, the processor 210 may be configured to receive inputs from the first detection unit 202, the second detection unit 204, the third detection unit 206 and the fourth detection unit 208 and process the inputs to assist the vehicle user during the vehicle backup/reverse operation, as described below.

In accordance with one or more aspects, to assist the vehicle user during the vehicle reverse operation, the processor 210 may first detect whether the vehicle 200 is in the reverse mode. Specifically, the processor 210 may receive a vehicle mode input from a vehicle transmission unit (not shown) and determine whether the vehicle 200 is in the reverse mode based on the vehicle mode input. In some aspects, the processor 210 may receive the vehicle mode input from the vehicle transmission unit (not shown) when the vehicle 200 enters the reverse mode.

Responsive to a determination that the vehicle 200 is in the reverse mode, the processor 210 may be configured to obtain the pre-stored instructions or logical steps from the vehicle reverse operation module 228 that may enable the processor 210 to assist the vehicle user in the vehicle reserve operation. Responsive to obtaining the pre-stored instructions, the processor 210 may execute the instructions.

In particular, the processor 210 may obtain a first input from the first detection unit 202 (e.g., the tailgate ajar switch). The first input may indicate whether the latch mechanism is in the open state or the closed state. The processor 210 may be configured to determine whether the tailgate 115 is in the retracted position or in the extended position based on the first input. For example, the processor 210 may determine that the tailgate 115 is in retracted position when the latch mechanism is in the closed state. Further, the processor 210 may determine that the tailgate 115 is in the extended position or in any intermediate position when the latch is in the open state. In other words, the processor 210 may determine whether the tailgate 115 is open or closed based on the first input.

The processor 210 may be further configured to obtain a second input from the second detection unit 204 and a third input from the third detection unit 206. In some aspects, the processor 210 may obtain the second input and the third input when the processor 210 determines that the tailgate 115 is open (e.g., when the tailgate 115 is in the fully extended/open position or in any intermediate position) based on the first input. In other aspects, the processor 210 may obtain only the second input when the tailgate 115 is open. In yet another aspect, the processor 210 may obtain the second input and/or the third input when the tailgate is in the closed position (i.e., the retracted position).

Figure 4:
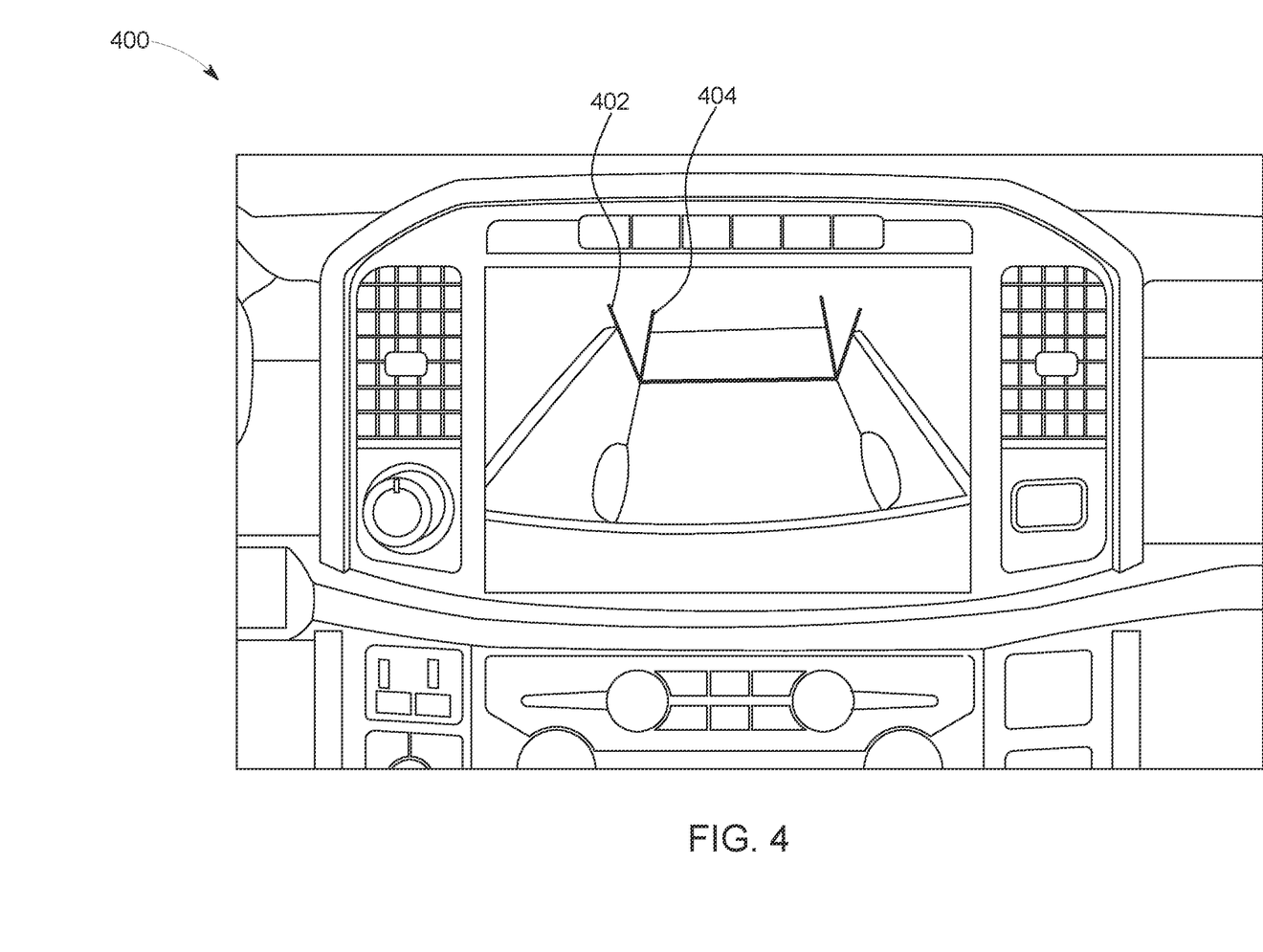
FIG. 4 illustrates a first example mechanism to determine a tailgate extended orientation, in accordance with the present disclosure.
Figure 5:
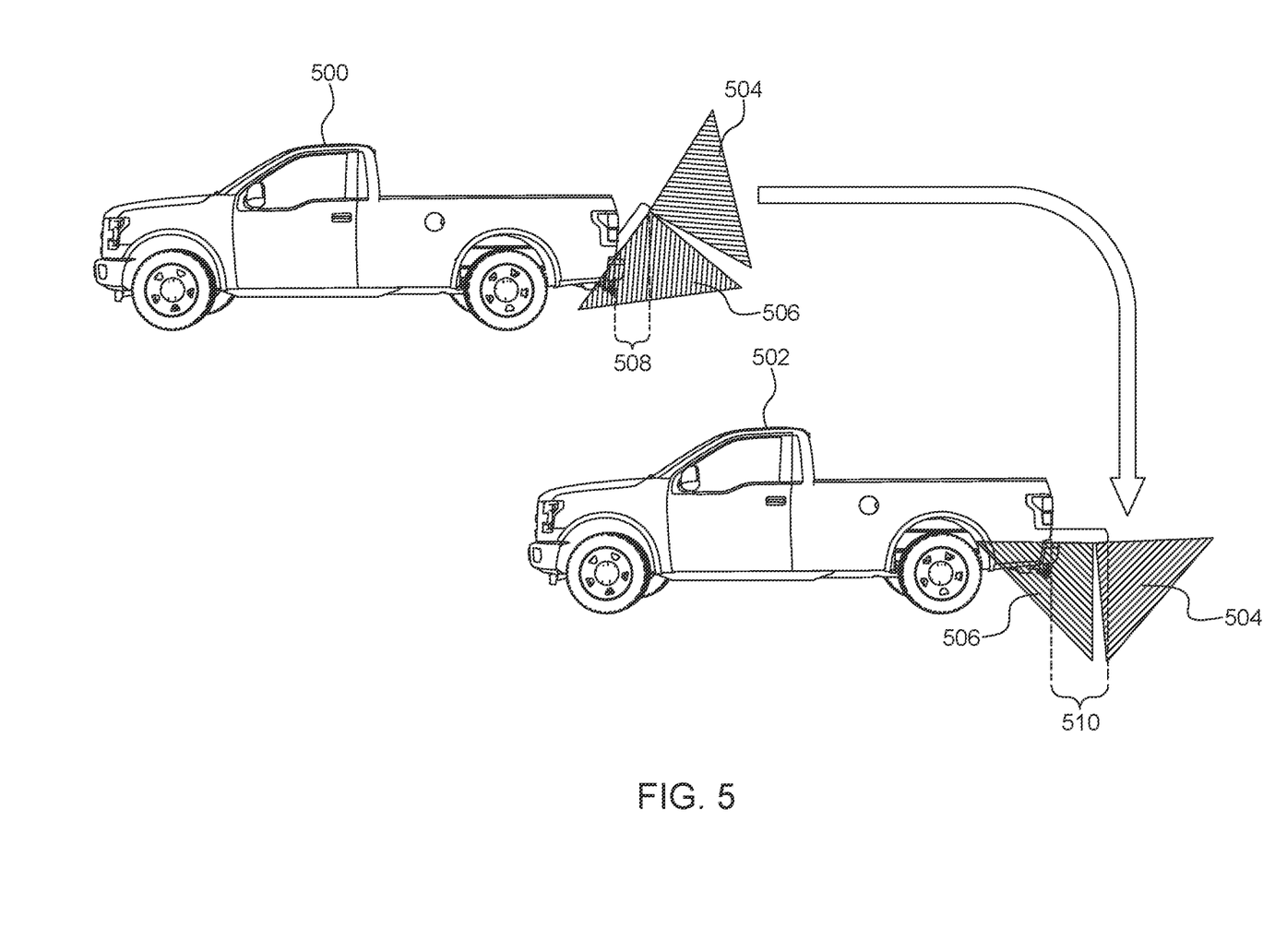
FIG. 5 illustrates a second example mechanism to determine the tailgate extended orientation, in accordance with the present disclosure.

Responsive to receiving the second input and/or the third input, the processor 210 may be configured to identify a tailgate extended orientation based on at least one of the second input and the third input. In other words, the processor 210 may use the second input and/or the third input to determine whether the tailgate 115 is in the fully extended position or in any intermediate position, when the processor 210 determines that the tailgate is open (from the first input). FIGS. 4 and 5 illustrate first and second example systems to determine a tailgate extended orientation, in accordance with the present disclosure.

In particular, FIG. 4 illustrates a mechanism to determine the tailgate extended orientation by using the second input. More particularly, FIG. 4 depicts a view of a human-machine interface 400 that may be installed in the vehicle 200. The human-machine interface 400 may be same as the human-machine interface 212. The human-machine interface 400 indicates an image (i.e., the second input) captured by the second detection unit 204. In some aspects, the processor 210 may obtain the image from the second detection unit 204 and generate a three-dimensional (3D) model or an augmented model from the captured image, as shown in FIG. 4.

Responsive to the 3D model generation, the processor 210 may determine an angle between a vehicle rear side edge 402 and a tailgate side edge 404. In some aspects, the processor 210 may be configured to determine the tailgate extended orientation based on the determined angle. For example, when the angle between the vehicle rear side edge 402 and the tailgate side edge 404 is 90 degrees, the processor 210 may determine that the tailgate 115 may be in the extended position (e.g., in the fully opened tailgate position). Similarly, if the angle is 45 degrees, the processor 210 may determine that the tailgate 115 may be at a center position between the fully retracted position and the fully extended position (i.e., the tailgate 115 may be in a half-opened tailgate position).

In further aspects, the processor 210 may determine that the tailgate 115 may be in the fully extended position, when the processor 210 is not able to detect the vehicle rear side edge 402 in the generated 3D model but may visualize a cargo load within the cargo box 110 in the 3D model. In additional aspects, the processor 210 may be configured to obtain pre-stored standard FoVs captured by the second detection unit 204 at different tailgate positions from the FoV database 230. The processor 210 may then compare the pre-stored standard FoVs with the captured image by using machine learning (or artificial intelligence) and identify the tailgate extended orientation based on the comparison.

In some scenarios, the second detection unit's FoV may be obstructed when the cargo box 110 may be loaded with a large cargo package. In such scenarios, the processor 210 may activate the third detection unit 206 to determine the tailgate extended orientation. In other words, the processor 210 may determine the tailgate extended orientation from the second input (obtained from the second detection unit 204) only when the second detection unit's FoV is not obstructed. However, the processor 210 may activate the third detection unit 206 and determine the tailgate extended orientation by using the third input when the processor 210 determines that the second detection unit's FoV may be obstructed. The details of tailgate extended orientation determination by using the third detection unit 206 may be understood in conjunction with FIG. 5.

Specifically, FIG. 5 illustrates an example mechanism to determine the tailgate extended orientation by using the third detection unit 206. FIG. 5 shows a first vehicle 500 and a second vehicle 502. The first vehicle 500 and the second vehicle 502 may be same as the vehicle 200. In particular, the first vehicle 500 depicts a partially open tailgate position and the second vehicle 502 indicates the fully opened tailgate position. The first vehicle 500 and the second vehicle 502 may include the third detection unit 206 mounted at the tailgate exterior surface, as described above. In some aspects, the third detection unit 206 may be a dual camera having two FoVs, shown as a top view 504 and a bottom view 506 in FIG. 5.

In some aspects, the processor 210 may obtain two images (i.e., two different FoVs) as the third input from the third detection unit 206 when the processor 210 activates the third detection unit 206. In addition, the processor 210 may obtain the pre-stored standard FoVs captured by the third detection unit 206 at different tailgate positions from the FoV database 230. Responsive to obtaining the two images and the standard FoVs, the processor 210 may compare the two images with the pre-stored FoVs by using machine learning (or artificial intelligence) and identify the tailgate extended orientation based on the comparison.

In further aspects, the processor 210 may evaluate the bottom view 506 and determine whether the bottom view 506 is associated with a ground scene view or a vehicle rear structure view. The processor 210 may determine that the tailgate 115 may be in the retracted position when the processor 210 determines that the bottom view 506 is associated with the ground scene view (or any other view) with no vehicle structure view. Further, the processor 210 may determine that the tailgate 115 may be in a partially open position, when the bottom view 506 is associated with both the ground scene view and the vehicle rear structure view (as shown for the first vehicle 500). Furthermore, the processor 210 may determine that the tailgate 115 may be in the fully extended/open position, when the bottom view 506 is associated with only the vehicle rear structure view (as shown for the second vehicle 502).

In further aspects, the processor 210 may determine the tailgate extended orientation based on a combination of the first input, the second input and the third input. For example, when the first detection unit 202 detects that the tailgate 115 is in the retracted position, the processor 210 may or may not obtain the second input and the third input. In other aspects, the processor 210 may obtain the second input and the third input when the tailgate 115 is in the retracted position. In this case, the second detection may indicate that the angle between the vehicle rear side edge 402 and the tailgate side edge 404 is zero degrees. Further, the third detection unit 206 (specifically, the bottom view 506) may indicate the ground scene view and no vehicle structure view when the tailgate 115 is in the retracted position.

Further, when the tailgate 115 is in the open position, the first detection unit 202 may detect that the tailgate 115 is in the open position and may not determine whether the tailgate 115 is in the fully extended position or between the retracted position and the fully extended position. In this case, the processor 210 may obtain the second input from the second detection unit 204 to determine the tailgate extended orientation as described above. However, if the second detection unit FoV is obstructed, the processor 210 may obtain the third input from the third detection unit and determine the tailgate extended orientation in the manner described above.

Responsive to determining the tailgate extended orientation as described above, the processor 210 may calculate an extended tailgate portion length based on the tailgate extended orientation. In particular, the processor 210 may obtain the tailgate dimensions from the tailgate database 226 and calculate the extended tailgate portion length based on the tailgate dimensions. Specifically, the processor 210 may obtain a tailgate length (e.g., a length from the tailgate bottom side 120 to the tailgate top side 125) from the tailgate database 226 and correlate the tailgate length with the angle between the vehicle rear side edge and the tailgate side edge. Responsive to the correlation, the processor 210 may calculate the extended tailgate portion length. For example, when the tailgate length is two feet (obtained from the tailgate database 226) and the angle is 90 degrees, the processor 210 may determine that the extended tailgate portion length is two feet (i.e., equal to the tailgate length). Similarly, if the angle between the vehicle rear side edge and the tailgate side edge is 45 degrees, the processor 210 may determine that the extended tailgate portion length is 1.414 feet. Examples of extended tailgate portion lengths are shown as a first length 508 and a second length 510 in FIG. 5.

In further aspects, the processor 210 may be configured to detect a presence of an obstacle in a vehicle rear side proximity based on at least one of the second input and the third input. In some aspects, the processor 210 may detect an obstacle presence when the vehicle 200 is in the reverse mode and when the tailgate 115 is in the open position (either in the fully extended position or between the fully extended position and the retracted position).

Figure 6:
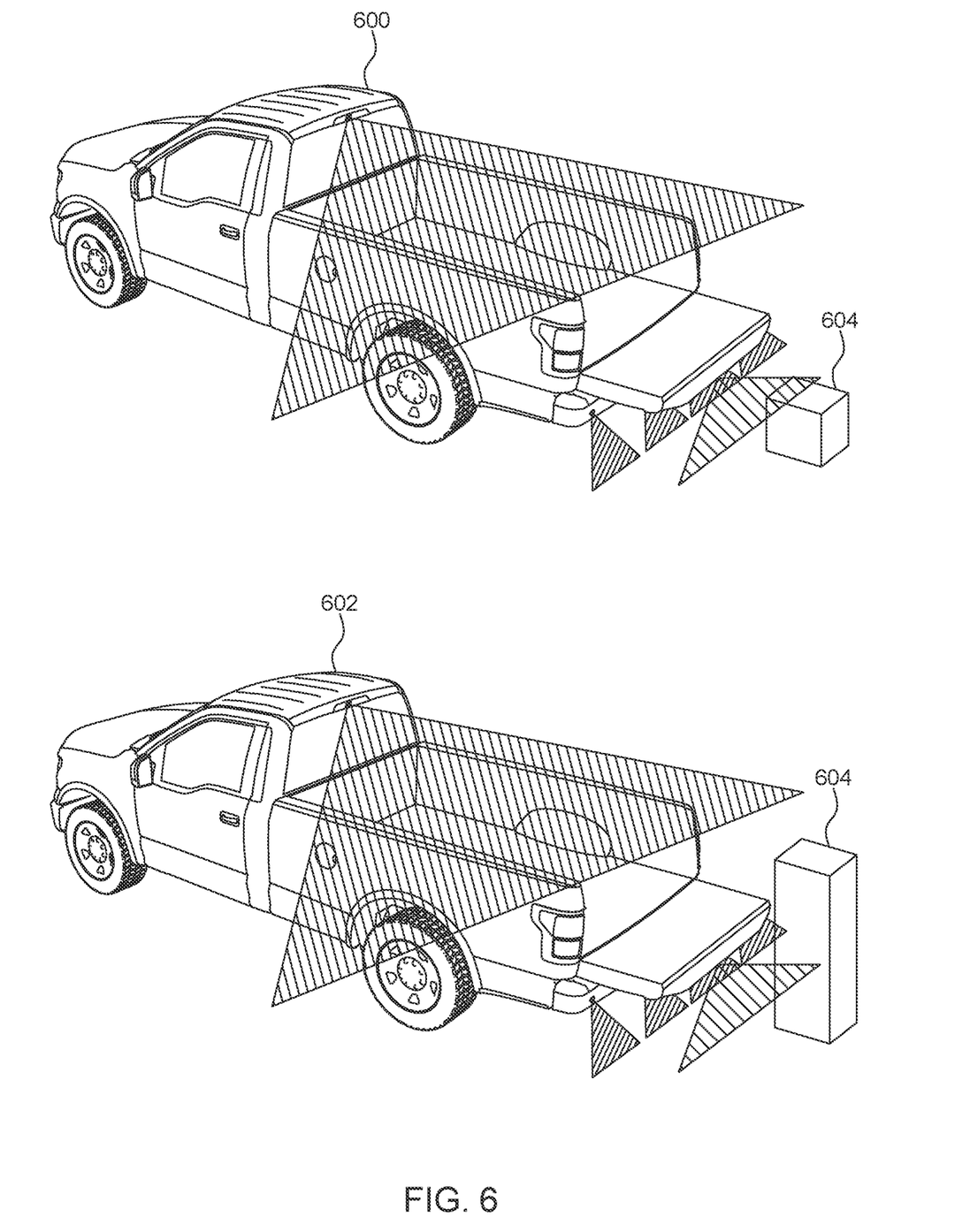
FIG. 6 depicts an example system to evaluate an obstacle in proximity to a vehicle rear side in accordance with the present disclosure.

In additional aspects, the processor 210 may be configured to detect the obstacle presence based on a fourth input obtained from the fourth detection unit 208. In yet another aspect, the processor 210 may determine the obstacle presence based on a combination of the second input, the third input and the fourth input. For example, when all the three detection units (i.e., the second detection unit 204, the third detection unit 206 and the fourth detection unit 208) indicate that there is no obstacle in the vehicle rear side proximity, the processor 210 may determine that there is no obstacle at the vehicle rear side. However, if any detection unit indicates the obstacle presence (e.g., presence of a second vehicle near the vehicle rear side), the processor 210 may determine that the obstacle may be present near the vehicle rear side. When the processor 210 determines the obstacle presence, the processor 210 may perform obstacle evaluation. FIG. 6 depicts an example system to evaluate an obstacle 604 in proximity to the vehicle rear side in accordance with the present disclosure.

In particular, FIG. 6 illustrates vehicles 600 and 602 (same as the vehicle 200) with the tailgate 115 in the fully extended position. During the vehicle reverse operation, the processor 210 may determine the obstacle presence at the vehicle rear side and perform the obstacle evaluation. Specifically, the processor 210 may determine whether an obstacle height is above or below a tailgate level based on at least one of the obtained second input and/or the third input. For example, the processor 210 may determine that the obstacle height is above the tailgate level when the second detection unit 204 detects the obstacle. In another example, the processor 210 may determine that the obstacle height is below the tailgate level when the second detection unit 204 does not detect the obstacle (as the field of view may be obstructed), however the third detection unit 206 captures obstacle's top edges (with full boundary). In this case, the processor 210 may activate the fourth detection unit 208 to determine a distance between the obstacle 604 and the vehicle rear side (e.g., the rear vehicle bumper). The fourth detection unit 208 may send the determined distance to the processor 210, which may compare the distance with a predefined threshold distance (that may be stored in the memory 216). In some aspects, the processor 210 may notify/alert the vehicle user when the distance is less than the predefined threshold distance. The processor 210 may notify the vehicle user via an audio signal (e.g., by using the audio system 214) and/or a visual signal (e.g., by using the Human-Machine interface 212).

On the other hand, the processor 210 may determine that the obstacle height is above the tailgate level when both the second detection unit 204 and the third detection unit 206 detect the obstacle. In this case, the processor 210 may calibrate a fourth detection unit baseline or an ultrasonic sensor baseline to measure a distance between the tailgate top side 125 and the obstacle 604. The process of calibrating the ultrasonic sensor baseline may be understood in conjunction with FIG. 7.

Figure 7:
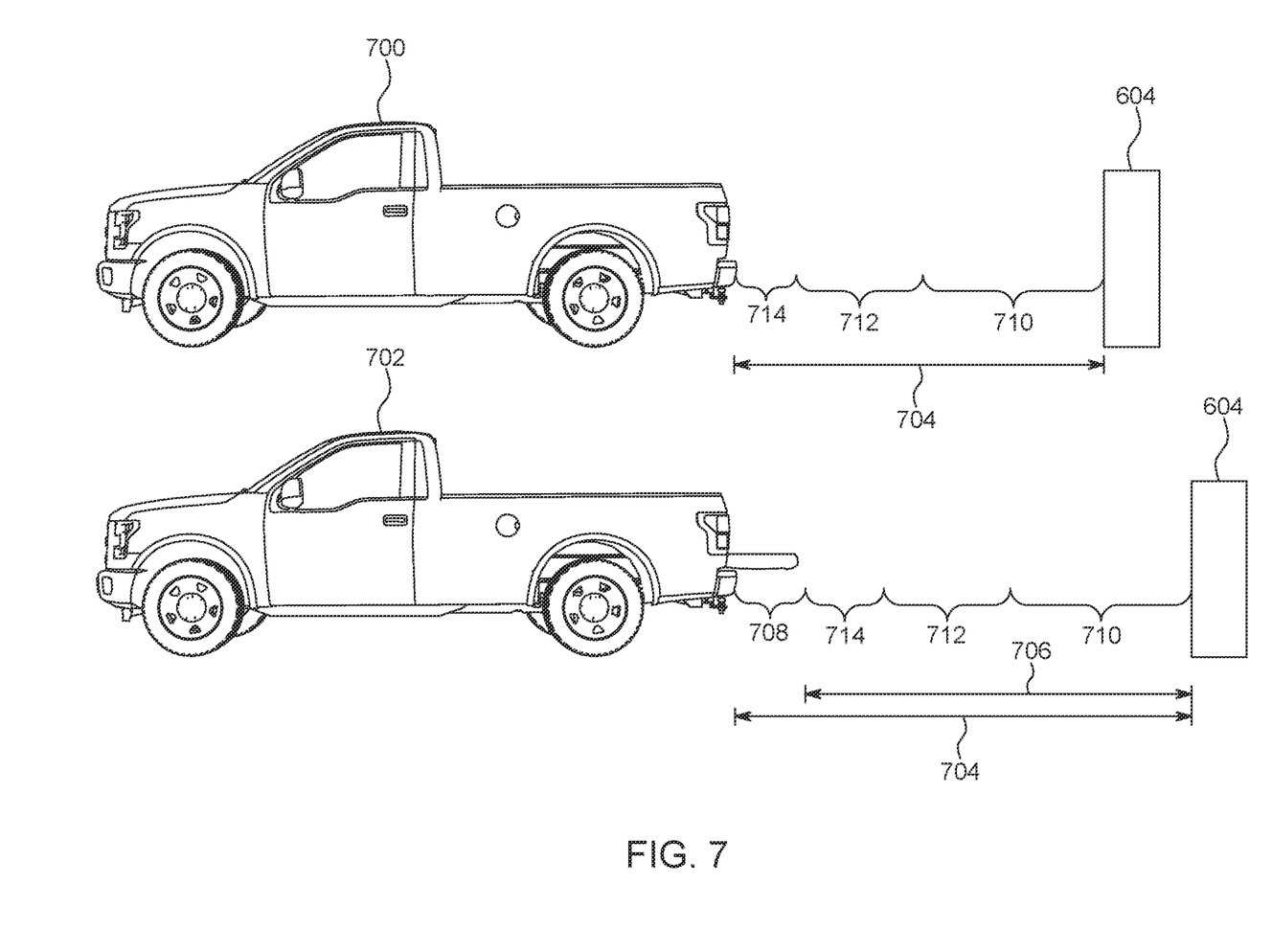
FIG. 7 depicts an example system to calculate distance between the obstacle and a tailgate top side, in accordance with the present disclosure.

FIG. 7 depicts an example system to calculate the distance between the obstacle 604 and the tailgate top side 125, in accordance with the present disclosure. In particular, FIG. 7 depicts a first vehicle 700 and a second vehicle 702 that may be same as the vehicle 200. The vehicle 700 depicts the tailgate 115 in the retracted position and the vehicle 702 depicts the tailgate 115 is in the fully extended position. The vehicles 700 and 702 may include the fourth detection unit 208 (ultrasonic sensors) that may be configured to determine the distance between the rear vehicle bumper and the obstacle 604. In an exemplary aspect, the obstacle 604 may be present near the vehicle rear side of the vehicles 700 and 702, and the obstacle height may be above the tailgate level.

Responsive to determining that the obstacle height is above the tailgate level, the processor 210 may activate the fourth detection unit 208 and determine a distance 704 between the obstacle 604 and the vehicle rear side (e.g., the rear vehicle bumper). Further, the processor 210 may calibrate the ultrasonic sensor baseline by subtracting the extended tailgate portion length (calculated by the processor 210, as described above) from the determined distance 704

(as received from the fourth detection unit 208) to calculate a calibrated distance 706 between the obstacle 604 and the tailgate top side 125. An example of an extended tailgate portion length is shown as a length 708 in FIG. 7. A person ordinarily skilled in the art may appreciate that in the vehicle 700, the tailgate 115 is in the retracted position and hence the length 708 is zero. In the vehicle 702, the tailgate 115 is in the fully extended position and hence the length 708 is same as the tailgate length.

Responsive to calculating the calibrated distance 706, the processor 210 may compare the calibrated distance 706 with the predefined threshold distance. The processor 210 may notify the vehicle user when the calibrated distance 706 is less than the predefined threshold distance. As described above, in some aspects, the processor 210 may notify the vehicle user via the audio system 214. In this case, in an exemplary aspect, the processor 210 may vary an audio notification intensity based on the calibrated distance 706. For example, the audio intensity may increase gradually as the calibrated distance 706 decreases, when the vehicle user reverses the vehicle 700 or 702.

In other aspects, the processor 210 may provide visual notification to the vehicle user via the human-machine interface 212. In this case, the processor 210 may segregate the calibrated distance 706 in different zones (safe zone, alert zone, etc.) on the human-machine interface 212 and may indicate the zones in different colors (such as red, yellow, green, etc.). Specifically, the processor 210 may identify an obstacle location in a zone (by calculating the calibrated distance 706) and then display the obstacle location with respect to the zone on the human-machine interface 212. In some aspects, the processor 210 may augment the visual notification with the audio notification. For instance, when the obstacle 604 is in a zone 710, the processor 210 may not generate any audio notification. When the obstacle 604 is in a zone 712, the processor 210 may generate a moderate audio notification (such as an audio beep at low frequency and intensity). When the obstacle is in zone 714, the processor 210 may generate a high audio notification (such as an audio beep at high frequency and intensity).

In this manner, the processor 210 may assist the vehicle user to reverse the vehicle 702 with the extended tailgate 115, based on the tailgate extended orientation. In some aspects, the vehicle user may take remedial actions (e.g., stop the vehicle reverse/backup operation) based on the received audio or visual notification.

Figure 8:
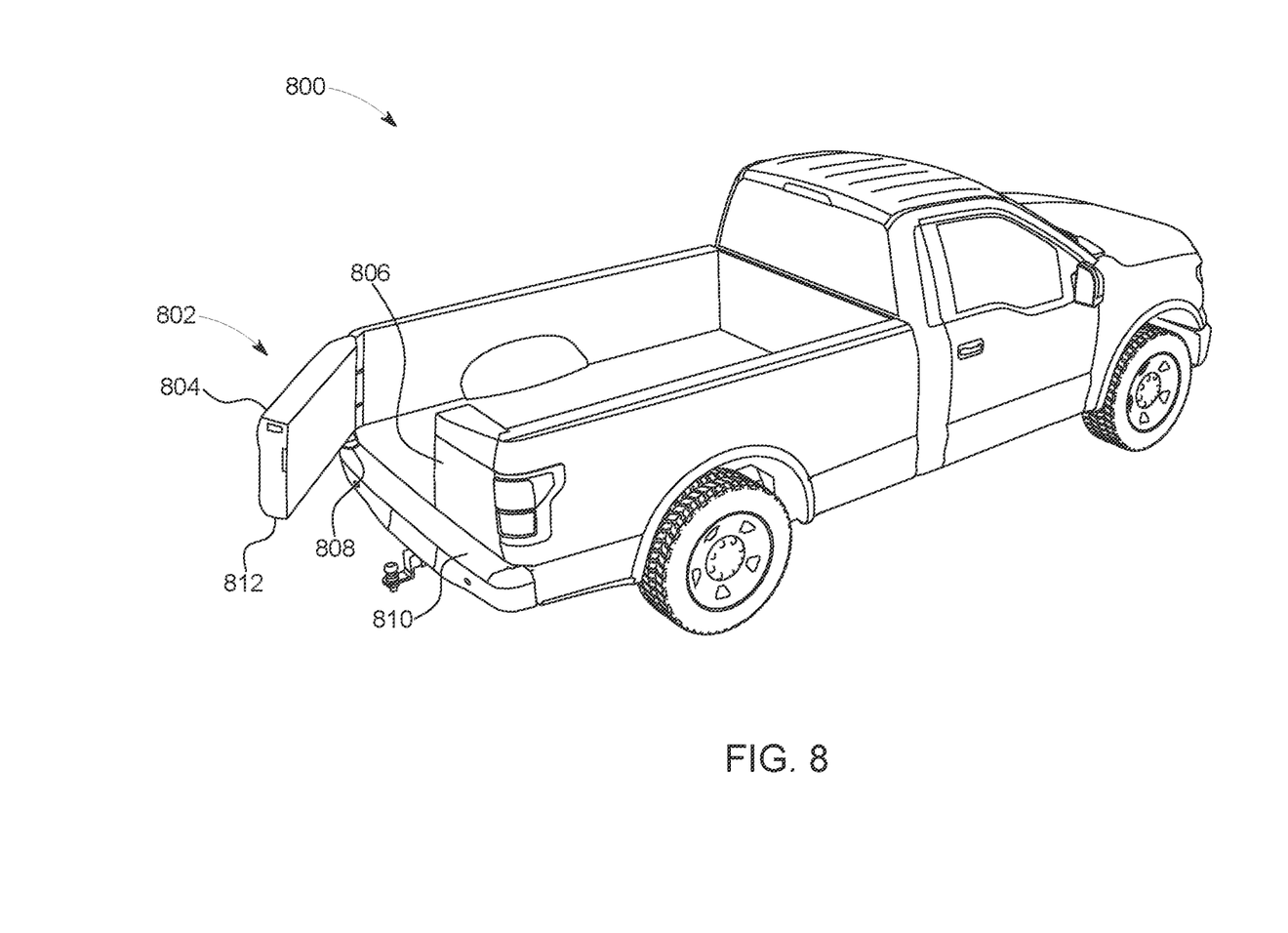
FIG. 8 depicts another example vehicle in which techniques and structures for providing the systems and methods disclosed herein may be implemented.

FIG. 8 depicts another example vehicle 800 in which techniques and structures for providing the systems and methods disclosed herein may be implemented. The vehicle 800 may include a split tailgate 802. The split tailgate 802 may include a first part 804 and a second part 806. The first part 804 and the second part 806 may be side-hinged. Stated another way, the first part 804 and the second part 806 may be hinged at tailgate side edges. The first part 804 and the second part 806 may be configured to move between the extended position and the retracted position via the tailgate side edges.

The split tailgate 802 may have double tailgates having lengths in ratios of 50:50, 60:40, 70:30 and the like. Thus, in some aspects, the first part 804 and the second part 806 may have equal lengths. In other aspects, a first part length may be greater than a second part length, which may be in ratio of 6:4, 7:3 and the like.

In accordance with the present disclosure, the first detection unit 202 may be further configured to detect whether the first part 804 and/or the second part 806 are in extended or retracted position. Further, the first detection unit 202 may be configured to detect whether both the first part 804 and the second part 806 are in retracted/extended position or whether one of the first part 804 and the second part 806 is in retracted/extended position. As described above in conjunction with FIG. 2, the processor 210 may obtain the first input from the first detection unit 202. The first input may indicate whether the first part 804 and/or the second part 806 are in the retracted or extended position.

When the processor 210 determines that the first part 804 and/or the second part 806 is in the extended position, the processor 210 may obtain at least one of the second input and the third input to determine the tailgate extended orientation as discussed above in conjunction with FIG. 4. For example, the processor 210 may obtain an image (as the second input) captured by the second detection unit 204 and determine an angle 808 between a vehicle bottom side edge 810 (or a cargo box rear bottom edge 810) and a tailgate bottom edge 812. The processor 210 may determine the angle 808 for both the first part 804 and the second part 806, and determine the tailgate extended orientation of both the first part 804 and the second part 806.

In further aspects, the processor 210 may determine the obstacle presence and evaluate the obstacle height in a same manner as described above in conjunction with FIG. 6. The processor 210 may further calculate a distance between the obstacle and the tailgate edges (a first part 804 edge and/or a second part 806 edge) when any of the first part 804 and the second part 806 is in extended position, as described above in conjunction with FIG. 7. The processor 210 may further notify the vehicle user when the calculated distance is less than the predefined threshold distance.

Figure 9:
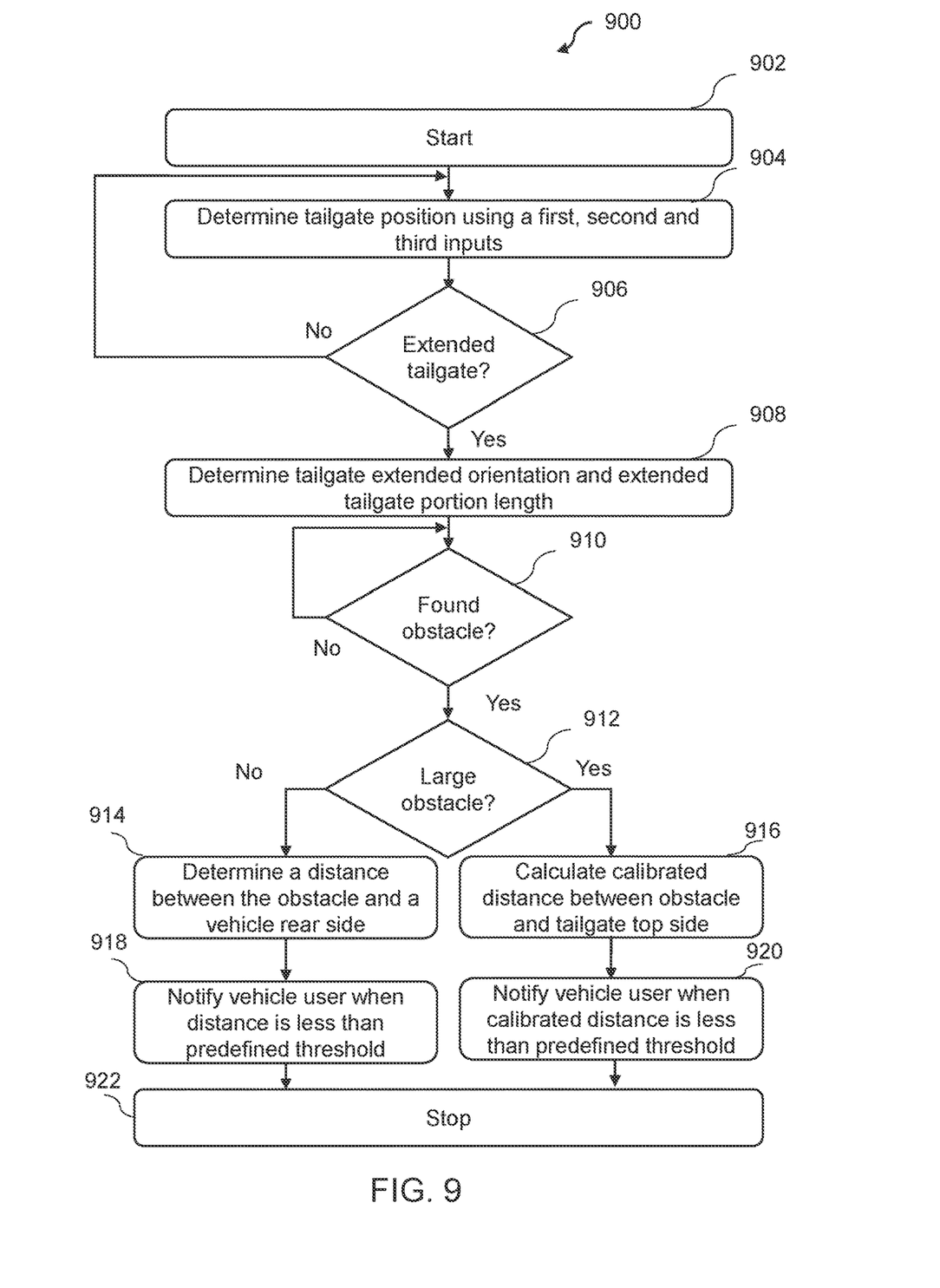
FIG. 9 depicts a flow diagram of an example method for assisting the vehicle user during the vehicle reverse operation, in accordance with the present disclosure.

FIG. 9 depicts a flow diagram of an example method 900 for assisting the vehicle user during the vehicle reverse operation, in accordance with the present disclosure. FIG. 9 may be described with continued reference to prior figures, including FIGS. 1-8. The following process is exemplary and not confined to the steps described hereafter. Moreover, alternative embodiments may include more or less steps that are shown or described herein and may include these steps in a different order than the order described in the following example embodiments.

Referring to FIG. 9, at step 902, the method 900 may commence. At step 904, the method 900 may include determining, by the processor 210, a vehicle tailgate position by using a first, a second and a third input. As described above, the processor 210 may determine the vehicle tailgate position when the vehicle 200 is in the reverse mode. Specifically, the processor 210 may determine whether the tailgate 115 is in the retracted position, the fully extended position or in any intermediate position, based on the first, second and third inputs received from the first detection unit 202, the second detection unit 204 and the third detection unit 206 respectively.

Responsive to determining the vehicle tailgate position, at step 906, the method 900 may include determining, by the processor 210, whether the tailgate 115 is in the extended position. When the processor 210 determines that the tailgate 115 is in the extended position, the method 900 moves to step 908.

At step 908, the method 900 may include determining, by the processor 210, the tailgate extended orientation and the extended tailgate portion length. The process of determining the tailgate extended orientation and the extended tailgate portion length is already described above in conjunction with FIG. 2.

At step 910, the method 900 may include detecting, by the processor 210, the obstacle 604 in the vehicle rear side proximity. Responsive to detecting the obstacle 604, at step 912, the method 900 may include determining, by the processor 210, whether the obstacle 604 is large. Specifically, as described above, the processor 210 may determine whether the obstacle height is above the tailgate level, based on at least one of the second input and the third input received from the second detection unit 204 and the third detection unit 206 respectively.

At step 914, the method 900 may include determining, by the fourth detection unit 208, the distance between the obstacle 604 and the vehicle rear side (e.g., the rear vehicle bumper), when the obstacle height is below the tailgate level (i.e., when the obstacle 604 is not large). At step 916, the method 900 may include calculating, by the processor 210, the calibrated distance 706 between the obstacle 604 and the tailgate top side 125, when the obstacle height is above the tailgate level (i.e., when the obstacle 604 is large). The process of calculating the calibrated distance 706 is described above in conjunction with FIG. 7.

At step 918, the method 900 may include notifying, by the processor 210, the vehicle user when the distance between the obstacle 604 and the vehicle rear side is less than the predefined threshold distance, and when the obstacle height is below the tailgate level. A step 920, the method 900 may include notifying, by the processor 210, the vehicle user when the calibrated distance 706 is less than the predefined threshold distance and when the obstacle height is above the tailgate level.

The method 900 ends at step 922.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
   a tailgate configured to move between a retracted position and an extended position;
   a first detection unit configured to detect a tailgate latch state;
   a second detection unit configured to capture a vehicle cargo box view;
   a third detection unit configured to capture a vehicle rear view;
   a control unit communicatively coupled to the first detection unit, the second detection unit and third detection unit, wherein the control unit is configured to:
   obtain a first input from the first detection unit;

determine, based on the first input, that the tailgate is in the retracted position or in the extended position;

obtain, based on the tailgate being in the extended position or between the retracted position and the extended position, a second input from the second detection unit;

identify, based on the second input, that a field of view of the second detection unit is obstructed;

activate the third detection unit based on the second detection unit field of view being obstructed;

determine, based on a third input from the third detection unit, that a tailgate extended orientation is an intermediate position by determining that a field of view of the third detection unit comprises a view of a ground underneath the vehicle and a structure of the vehicle;

calculate a tailgate level using a length of the tailgate and an angle of the tailgate in the intermediate position;

determine, based on the third input, a presence of an obstacle in proximity of a vehicle rear side;

determine, based on the third input, whether an obstacle height is above the tailgate level;

calculate a distance between the obstacle and a tailgate edge based on the tailgate extended orientation when the obstacle height is above the tailgate level; and notify a vehicle user when the distance is less than a predetermined threshold.

2. The vehicle of claim 1, wherein the control unit is further configured to:
determine whether the vehicle is in a reverse mode; and
obtain the first input based on the vehicle being in the reverse mode.

3. The vehicle of claim 1 further comprising a first tailgate latch and a second tailgate latch, and the first detection unit is configured to detect the tailgate latch state by determining a first tailgate latch state and a second tailgate latch state.

4. The vehicle of claim 1, wherein the tailgate is a split tailgate having a first part and a second part, wherein the first part and the second part are side-hinged, and wherein identifying the tailgate extended orientation comprises determining an angle between a rear bottom edge of a cargo box of the vehicle and a bottom edge of the first part of the tailgate.

5. The vehicle of claim 1, wherein the control unit is further configured to:
identify the tailgate extended orientation based on the second input and an angle between a vehicle rear side edge and a tailgate side edge.

6. The vehicle of claim 1, wherein the control unit is further configured to:
calculate a length of an extended tailgate portion based on the tailgate extended orientation; and
calculate the distance between the obstacle and the tailgate edge based on the length.

7. The vehicle of claim 1 further comprising ultrasonic sensors mounted in a vehicle rear fascia, wherein the control unit is further configured to:
obtain a fourth input from the ultrasonic sensors;
determine the presence of the obstacle based on the fourth input; and
determine whether the obstacle height is above the tailgate level based on the fourth input.

8. The vehicle of claim 1, wherein the control unit is further configured to:
calibrate an ultrasonic sensor distance baseline based on the distance; and
notify the vehicle user based on the calibration.

9. A method to assist a vehicle user during backup of a vehicle having a tailgate, the method comprising:
obtaining, by a processor, a first input from a first detection unit configured to detect a tailgate latch state, wherein the tailgate is configured to move between a retracted position and an extended position;
determining, by the processor, whether the tailgate is in the retracted position or in the extended position based on the first input;
obtaining, by the processor, a second input from a second detection unit based on the tailgate being in the extended position or between the retracted position and the extended position, wherein the second detection unit is configured to capture a vehicle cargo box view;
identifying, by the processor, that a field of view of the second detection unit is obstructed based on the second input;
activating, by the processor, a third detection unit based on the second detection unit field of view being obstructed, wherein the third detection unit is configured to capture a vehicle rear view;
determining, by the processor and based on a third input from the third detection unit, that a tailgate extended orientation is an intermediate position by determining that a field of view of the third detection unit comprises a view of a ground underneath the vehicle and a structure of the vehicle;
calculating, by the processor, a tailgate level using a length of the tailgate and an angle of the tailgate in the intermediate position;
determining, by the processor, a presence of an obstacle in proximity of a vehicle rear side based on the third input;
determining, by the processor, whether an obstacle height is above a tailgate level based on the third input;
calculating, by the processor, a distance between the obstacle and a tailgate edge based on the tailgate extended orientation when the obstacle height is above the tailgate level; and notifying, by the processor, the vehicle user when the distance is less than a predetermined threshold.

10. The method of claim 9 further comprising:
determining whether the vehicle is in a reverse mode; and
obtaining the first input based on the vehicle being in the reverse mode.

11. The method of claim 9, wherein the vehicle comprises a first tailgate latch and a second tailgate latch, and the first detection unit is configured to detect the tailgate latch state by determining a first tailgate latch state and a second tailgate latch state.

12. The method of claim 9, wherein the tailgate is a split tailgate having a first part and a second part, wherein the first part and the second part are side-hinged, and wherein the first detection unit is further configured to detect the tailgate latch state of the first part and the second part.

13. The method of claim 9, further comprising:
identifying, by the processor, the tailgate extended orientation based on the second input and an angle between a vehicle rear side edge and a tailgate side edge.

14. The method of claim 9, further comprising:
calculating a length of an extended tailgate portion based on the tailgate extended orientation; and
calculating the distance between the obstacle and the tailgate edge based on the length.

15. The method of claim 9 further comprising:
obtaining a fourth input from ultrasonic sensors mounted in a vehicle rear fascia;

determining the presence of the obstacle based on the fourth input; and determining whether the obstacle height is above the tailgate level based on the fourth input.

16. The method of claim 9 further comprising:
calibrating an ultrasonic sensor distance baseline based on the distance; and
notifying the vehicle user based on the calibration.

17. A non-transitory computer-readable storage medium in a distributed computing system, the non-transitory computer-readable storage medium having instructions stored thereupon which, when executed by a processor, cause the processor to:

obtain a first input from a first detection unit configured to detect a tailgate latch state of a tailgate in a vehicle, wherein the wherein the tailgate is configured to move between a retracted position and an extended position;

determine whether the tailgate is in the retracted position or in the extended position based on the first input;

obtain a second input from a second detection unit based on the tailgate being in the extended position or between the retracted position and the extended position, wherein the second detection unit is configured to capture a vehicle cargo box view;

identify based on the second input that a field of view of the second detection unit is obstructed;

activate the third detection unit based on the second detection unit field of view being obstructed;

determine, based on a third input from a third detection unit configured to capture a vehicle rear view, that a tailgate extended orientation is an intermediate position by determining that a field of view of the third detection unit comprises a view of a ground underneath the vehicle and a structure of the vehicle;

calculate a tailgate level using a length of the tailgate and an angle of the tailgate in the intermediate position;

determine a presence of an obstacle in proximity of a vehicle rear side based on the third input;

determine whether an obstacle height is above the tailgate level based on the third input;

calculate a distance between the obstacle and a tailgate edge based on the tailgate extended orientation when the obstacle height is above the tailgate level; and notify a vehicle user when the distance is less than a predetermined threshold.

18. The non-transitory computer-readable storage medium of claim 17, having further instructions stored thereupon to:

determine whether the vehicle is in a reverse mode; and
obtain the first input based on the vehicle being in the reverse mode.

19. The non-transitory computer-readable storage medium of claim 17, having further instructions stored thereupon to:

identify the tailgate extended orientation based on the second input and an angle between a vehicle rear side edge and a tailgate side edge;

determine whether a second detection unit field of view is obstructed; and activate the third detection unit to identify the tailgate extended orientation based on the second detection unit field of view being obstructed.

20. The non-transitory computer-readable storage medium of claim 17, having further instructions stored thereupon to:

obtain a fourth input from ultrasonic sensors mounted in a vehicle rear fascia;

determine the presence of the obstacle based on the fourth input; and determine whether the obstacle height is above the tailgate level based on the fourth input.

* * * * *